Feb. 22, 1966      B. NUSS      3,237,142

HIGH CAPACITY ELECTRIC HEATER

Filed Feb. 28, 1961      7 Sheets-Sheet 1

INVENTOR.
BERTHOLD NUSS
BY
ATTORNEYS

Feb. 22, 1966        B. NUSS        3,237,142

HIGH CAPACITY ELECTRIC HEATER

Filed Feb. 28, 1961        7 Sheets-Sheet 2

BERTHOLD NUSS
INVENTOR

BY *Dicke & Craig*

ATTORNEYS

Feb. 22, 1966  B. NUSS  3,237,142
HIGH CAPACITY ELECTRIC HEATER
Filed Feb. 28, 1961  7 Sheets-Sheet 3

INVENTOR.
BERTHOLD NUSS
BY
Dicke, Craig & Freudenberg
ATTORNEYS

BERTHOLD NUSS
INVENTOR

Feb. 22, 1966     B. NUSS     3,237,142
HIGH CAPACITY ELECTRIC HEATER
Filed Feb. 28, 1961     7 Sheets-Sheet 5

INVENTOR.
BERTHOLD NUSS
BY
ATTORNEYS

Feb. 22, 1966 B. NUSS 3,237,142
HIGH CAPACITY ELECTRIC HEATER
Filed Feb. 28, 1961 7 Sheets-Sheet 6

INVENTOR.
BERTHOLD NUSS
BY
*Aicke, Craig & Freudenberg*
ATTORNEYS

Feb. 22, 1966      B. NUSS      3,237,142
HIGH CAPACITY ELECTRIC HEATER
Filed Feb. 28, 1961      7 Sheets-Sheet 7

INVENTOR.
BERTHOLD NUSS
BY
ATTORNEYS

United States Patent Office 3,237,142
Patented Feb. 22, 1966

3,237,142
HIGH CAPACITY ELECTRIC HEATER
Berthold Nuss, Kandel, Pfalz, Germany, assignor to Fritz Eichenauer, Kandel, Pfalz, Germany, a German firm
Filed Feb. 28, 1961, Ser. No. 92,216
Claims priority, application Germany, Mar. 5, 1960, E 18,997; July 2, 1960, E 19,559; Jan. 25, 1961, E 20,503
5 Claims. (Cl. 338—280)

The present invention relates to a high capacity electric heater for heating gaseous media, especially air, and for producing a considerable heating power within a relatively small space in which the cross-sectional area available for the flow of air therethrough will be unobstructed and therefore as large as possible.

Prior to this invention, electric heaters for flowing air and often also for stagnant air were required to be built so that the ratio of the heating capacity to the size of the heating element or to the amount of air flowing through the heater would not exceed a certain value so as to prevent the heating conductors from being overheated or from lighting up and to prevent the disadvantages resulting therefrom. Furthermore, the temperature of the air emerging from the heater should not be too high in order to prevent offensive odors, for example, by the combustion of dust. A disadvantage of all previous electric heaters, especially those containing heating coils, consisted in their tendency toward acoustic reactions when air passes therethrough, especially at high air velocities and when the heater is in operation. Even the so-called heating grids, that is, flat heating elements produced by weaving which have sometimes been used have the mentioned as well as additional disadvantages, apart from the fact that they can be used only for special purposes and especially such purposes in which the cross-sectional relations are of secondary importance.

In view of the above-mentioned prerequisites and disadvantages, all of the known electric heaters, for example, heating fans, had to be operated in actual practice in such a manner that, in order to attain the desired heating capacity, the heating conductors had to be heated to a temperature just below incandescence. Consequently, if the volume, velocity, or distribution of the air passing through the heater changed only slightly, or if the arrangement and position of the heating coils was slightly modified, the heating coils easily became heated to incandescence either locally at some points or entirely over the entire heating surface with the result that the heater burned out within a relatively short time.

It is an object of the present invention to provide an electric heater for heating gaseous media, especially air, that is, for example, a heater for a heating fan, blower, or the like, which is of a much more simple construction than the previous heaters and permits under the same specific load to apply a heating conductor of a considerably larger surface area within a given cross-sectional area of flow. A further object of the invention is to provide an electric heater in which structural elements within the cross-sectional area of flow of the air or gas are omitted as much as possible in order to improve the acoustic properties of the heater, that is, to render it as noiseless as possible when in operation.

The above-mentioned objects are attained according to the invention by the provision of an electric heating element which consists of one or more heating conductors which are wound in a meanderlike or zigzag-shaped formation, and the windings or filaments of which are freely suspended on at least one insulating supporting member so that the conductor itself will take up most or all of the static stresses occurring in the heater. The gaseous medium, for example, the air, is then conducted through this heater in a direction substantially vertical to the axis of the heating filaments.

In a preferred embodiment of the invention, the heating filaments are mounted so as to extend parallel to each other and at right angles to a pair of parallel frame members, while the turns between the adjacent filaments face toward and engage with these frame members. If necessary, these frame members may be connected to each other at their ends so as to form a closed rectangular frame. The means for securing the heater to an apparatus or housing and the electric connecting elements of the heater are then preferably connected to the frame. If the lateral insulating frame members are of a considerable length, one or more connecting elements may be provided for securing the frame members relative to each other and for tightening them relative to the substantially straight row of filaments between them.

The inventive design of the heating element, in which the freely suspended heating conductor itself takes up the mechanical pressures and stresses and therefore forms an essential part of the supporting structure, has the advantage that the entire cross-sectional area of the heater which lies within the flow of air or gas is unobtsructed by any additional structural elements and is therefore almost completely available for the free passage of the air therethrough. This results in very favorable acoustic properties since the critical Reynolds numbers of the blower will not be reached. The same fact also improves the uniformity of the temperature of the heating conductor since there are no parts of the conductor within the cross-sectional area of flow which are covered by any structural elements, and further since the inventive design of the heater permits the provision of a conductor of a very great length which therefore does not have to be subjected to such a high temperature load.

In order to prevent the individual filaments formed by the heating conductor from shifting laterally relative to each other at their points of engagement with the frame members, the turning points of the conductor between the adjacent filaments may be fixed in position in grooves, apertures, or the like in the frame members, and they may, if desired, be secured therein, for example, by being attached or cemented in place, for example, by plastic welding.

For a special application to fans or blowers with a circular outlet channel, the invention provides the heating filaments to be mounted between two annular frame members which are disposed coaxially within each other and do not require any additional frame members or other supporting elements because of the self-supporting structure of the filaments.

If the heating element is of a rectangular shape consisting of straight parallel frame members and heating filaments between these frame members, several of these heating elements may be easily combined and electrically connected to form one larger heating unit with a greater heating capacity.

In order to attain the object of the invention to provide the largest possible heating surface within a given area, the heating conductor is preferably provided of a bandlike shape of a rectangular or elliptical cross section and it is mounted between the frame members in a manner so that the lateral surfaces of the conductor lie in the direction of the flow of air or gas passing through the heater.

A further preferred embodiment of the invention of a principally similar type as the embodiments previously described provides that the entire heating conductor is mounted on only one supporting element so that its general longitudinal axis extends parallel thereto and its individual windings or filaments which extend substantially at right angles to this axis project freely toward one side of this supporting element. The heating conductor is then preferably wound so that the adjacent filaments project toward one side of the supporting element in the form of teeth of a coarse comb and have the statically most favorable triangular shape terminating in an acute angle.

A heating element of such a design has the advantage that it may be very easily manufactured and mounted and that it may be very easily combined with others of the same design to form a large variety of heating systems or units of different shapes. A very simple manner of securing such a heating element to its mounting element may also consist in making the latter of two parts, one of which is provided with apertures of a suitable size through which the tooth-shaped windings of the conductor are inserted to the root of each tooth, while the other imperforate part is applied upon or secured to the back of the first part so as to hold the windings in a fixed position. The triangular shape of the freely projecting parts of the windings then renders them very rigid in lateral directions.

A heating element according to a further embodiment of the invention is designed so that the mounting element of the heating conductor consists of a pair of strips or plates, each of which is provided with one or more rows of apertures into which the zigzag-shaped windings of the heating conductor are inserted, and in which each aperture in one mounting plate is directly superimposed upon a web between two adjacent apertures in the other mounting plate. The mounting element therefore consists of two parts, both of which are provided with similar apertures of a proper size in accordance with the medium distance between the adjacent filaments to permit the adjacent pairs of filaments to be passed alternately through these apertures in opposite directions.

The two parts of the mounting element are slipped from opposite sides over the comb-like teeth of the zigzag-shaped, acutely arcuate or meanderlike heating conductor and are then secured to each other. When these two relatively thin parts of the mounting element which consist of insulating material are pressed upon each other, the overlapping apertures and webs thereof when made of a proper size produce a slight deformation and thus a secure clamping of the individual filaments.

By such a bilateral arrangement of the heating filaments, the contact surface between them and the mounting element is reduced to a minimum and the free cross-sectional area of the heater for the flow of air or gas is increased to a maximum. This fact is particularly of advantage in reducing the noise of the air current flowing through the heater, and such noise may be further reduced by making the mounting element of a streamlined shape by tapering its edges. The manner of securing the filaments as above described also prevents them from being excessively cooled at their points of contact with the mounting element.

According to a preferred embodiment of the invention the webs intermediate the adjacent apertures in the supporting strips or plates are made slightly wider than the apertures so that a secure clamping effect upon the individual filaments will be attained.

If the heating unit is to be made of a larger size, the heating element may according to a further embodiment of the invention be provided with a pair of mounting strips or plates of insulating material, each of which is provided with an aperture for receiving one filament. These two mounting plates are spaced from each other at a distance equal to the distance between them and the turns of the zigzag-shaped conductor, and they are preferably connected to each other by crossbars to form a rigid rectangular frame.

In this embodiment, the individual filaments of the heating conductor are supported at a central part by the two spaced mounting plates of insulating material, while the ends of the filaments extend freely toward opposite sides of the mounting plates so that a relatively large cross-sectional area may be heated by the conductor without being materially limited or obstructed by supporting elements. If the heating conductor is made of a band-like material, the flat sides of which extend in the direction of the air current, there will be practically no reduction of the effective cross-sectional area of the heating element.

In addition to the mentioned mounting plates, auxiliary insulating supporting plates may also be provided at the outer sides of the mounting plates along the line of connection of the turns between the adjacent filaments. These supporting plates are connected to each other and to the mounting plates by means of crossbars so as to form a closed frame. They preferably also form the outer limitation of the cross-sectional area of flow and therefore do not reduce the latter. They likewise consist of insulating and heat resistant material, for example, mica; although in order to increase the solidity of the frame structure, they may also be made of outer metal strips or plates which are covered at the inside with insulating material which engages with the turns of the filaments.

In order to attain a heater with a greater heating capacity within a given cross-sectional area of flow, it is, of course, also possible to provide several heating conductors behind each other. It is for this purpose only necessary to make the mounting plates of a greater width and to provide them with several parallel rows of apertures for receiving the indivdual filaments of the adjacent heating conductors.

The opposite ends of the heating conductors are preferably extended at one side and provided with terminal strips for connecting them to a source of current. If the heating unit is provided with the additional outer supporting plates, the terminal strips which are secured to the ends of the heating conductors may be extended through one of these supporting plates at one side of the heating unit and be connected to the current at the outside of this supporting plate.

The above-mentioned as well as additional objects, features, and advantages of the present invention will become more clearly apparent from the following detailed description thereof which is to be read with reference to the accompanying drawings, in which—

FIGURE 11 shows a side view of a further modification of the heater according to the invention; while

Figure 1:
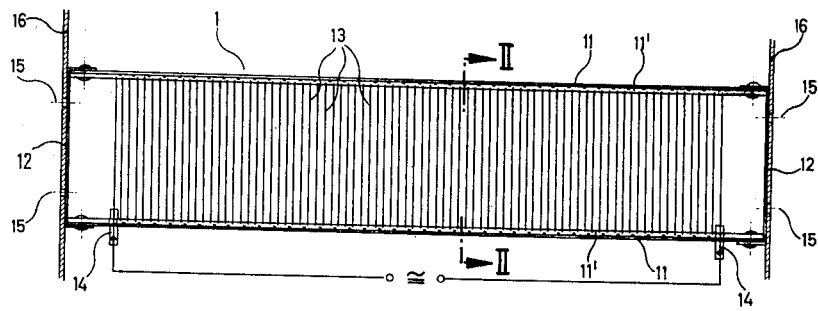
FIGURE 1 shows a side view of the preferred rectangular heater acording to the invention.
Figure 2:
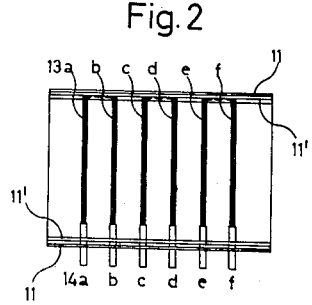
FIGURE 2 shows a cross section taken along line II—II of FIGURE 1.
Figure 1A:
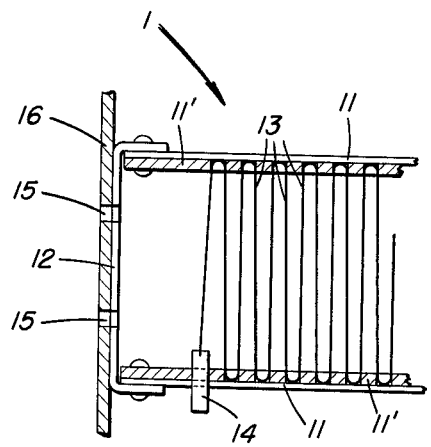
FIGURE 1a is a detail of the construction illustrated in FIGURE 1.

The rectangular heating element according to FIGURES 1, 1a consists of a pair of frame members 11, 11', the lateral members 12 at both sides of the frame, and the heating coil filaments which consist of band-shaped conducting material and are wound back and forth in a meanderlike arrangement between the two frame members 11, 11' so as to be spaced from each other. Each frame member 11, 11' consists of an inner perforated strip 11' with apertures of a length equal to the width of the conductor strip and of an outer unperforated strip 11. At their turns, the individual filaments are passed through the perforations in frame strips 11' and rest loosely on the outer frame strips 11, thereby taking up the small mechanical tension to which the frame is subjected. The perforations in the inner frame strips 11' prevent the turns of the filaments from shifting laterally. The ends of the conductor 13 or of the individual filaments 13a to 13f as shown in FIGURE 2, are passed by means of terminal strips 14 or 14a to 14f through frame strips 11' to the outside where they may be connected to an electric circuit either individually or combined in groups. The lateral arms 12 of the frame may be secured by suitable means such as bolts, rivets, welded joints, or the like to a housing, indicated at 16.

FIGURE 2 illustrates in detail the arrangement of the heating filaments 13 in frame members 11, 11' according to FIGURE 1. As indicated in dotted lines, filaments 13a to 13f are passed through the inner frame strip 11' and the ends of the individual filaments are provided with terminal strips 14a to 14f.

The advantages of a heating unit according to the invention will be evident from a consideration of FIGURES 1 and 2. The entire inner space of the frame formed by frame members 11, 11' and the lateral arms 12 is free of any structural elements which might obstruct the free flow of air therethrough, but it permits the provision of a heating conductor of a relatively great length. The use of thin flat ribbonlike conducting material which is mounted in the frame so that its surfaces extend parallel to the direction of flow of the gas or air current insures that, while the cross-sectional area of flow through the heating coil will be reduced only to a very small extent, the air current will pass along a very large heated surface.

Figure 3:
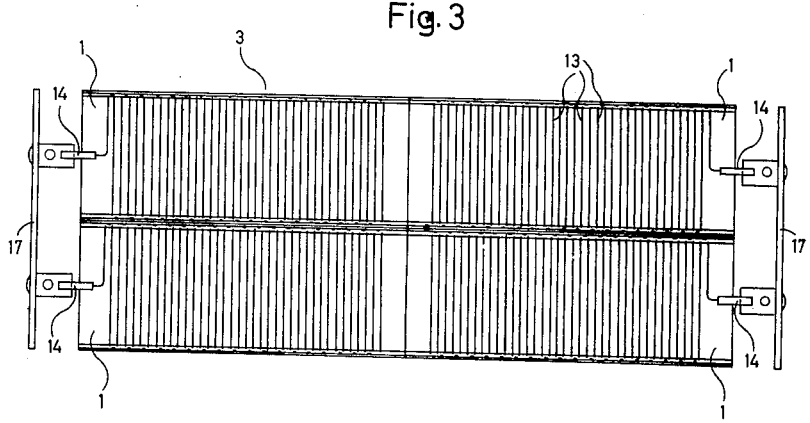
FIGURE 3 shows a side view of a heater which is composed of a pair of heating elements according to FIGURE 1.
Figure 3A:
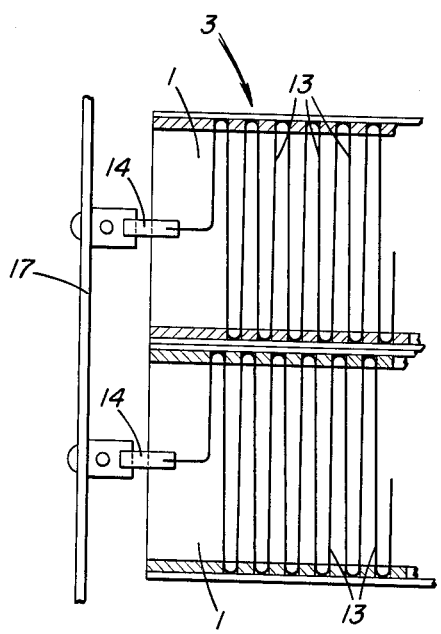
FIGURE 3a is a detail of the construction illustrated in FIGURE 3.

A heating element 1 of this type forms a structural unit which, as shown in FIGURES 3 and 3a, may be combined with two or more units of the same kind to form a larger more efficient assembly 3 with the same advantage as those of the individual unit, as above described. In this assembly 3, the lateral arms 12 of the individual frames are omitted since they are not required in view of the low mechanical stresses which are occurring. In this case, the parts of the heating conductor extending almost in a linear direction between the frame members take up the compressive load occurring by being mounted in an apparatus. The outer ends of each heating unit of the assembly 3 consisting of a heating element 1 are extended toward the outside where they may be connected by contact bars 17 or in any other suitable manner to a source of current.

Figure 4:
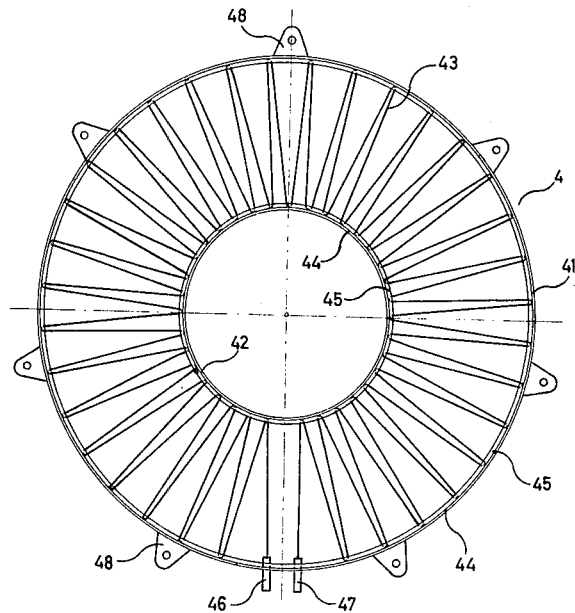
FIGURE 4 shows a side view of an annular heater which is principally similar to the heater according to FIGURE 1.
Figure 4A:
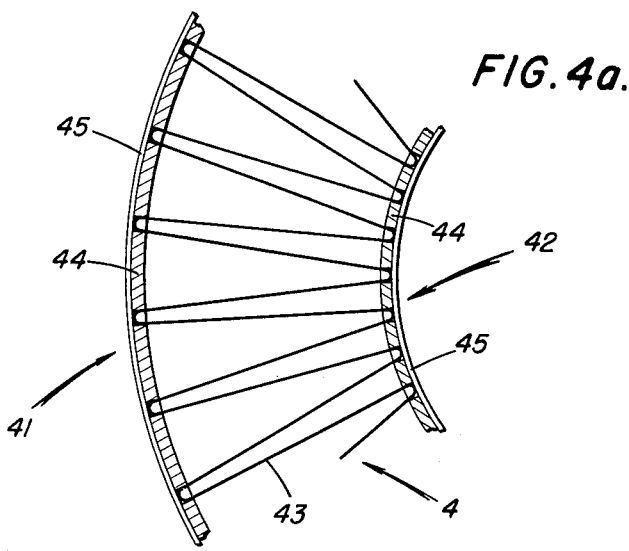
FIGURE 4a is a detail of the construction illustrated in FIGURE 4.

A heating element 4 which in principle is similar to the heating elements shown in FIGURES 1 to 3 is illustrated in FIGURES 4 and 4a. However, the filaments 43 in this heating element are mounted between two annular concentrical frame members 41 and 42, each of which, in turn, may consist of an inner frame strip 44 and an outer frame strip 45. The two ends of the heating conductor 43 are connected to terminals 46 and 47 which are to be connected to a source of current. The outer frame member 41 is provided with eyes 48 for securing the heating element 4 in a fixed position by means of bolts, rivets, or the like. The heating element is also in this case to be mounted so that the gas or air current will flow in a direction vertical to the plane of the filaments.

Figure 6:
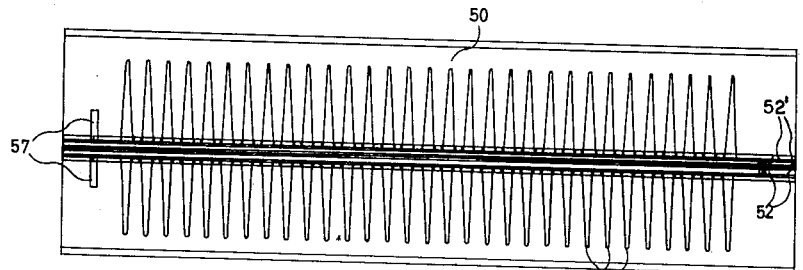
FIGURE 6 shows a side view of a heater which is composed of a pair of heating units of a type similar to FIGURE 5.
Figure 5:
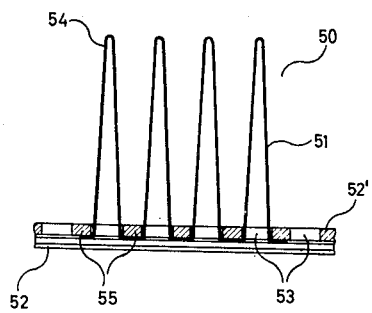
FIGURE 5 shows, partly in section, a side view of a part of another preferred embodiment of the heater according to the invention.
Figure 7:
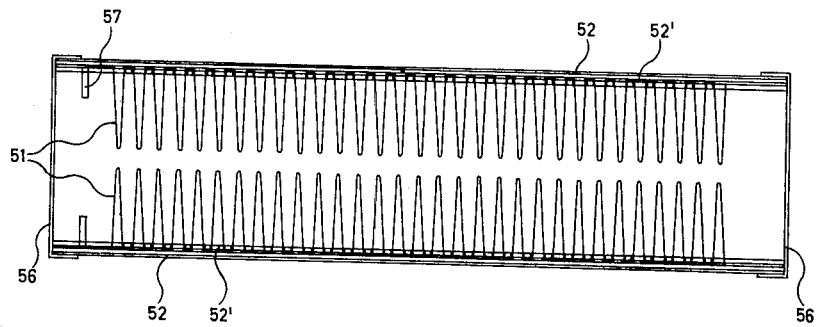
FIGURE 7 shows a side view of a heater which is composed of a pair of equal heating units according to a modification of FIGURES 5 and 6.

Another very simple and practical embodiment of the invention which is statically very suitable and applicable in many instances is illustrated in FIGURES 5, 6, and 7. FIGURE 5 shows a heating element 50 with an undulating heating conductor, the individual filaments 51 of which are bent at one end at a very small radius or at an acute angle, while at the opposite end they are bent substantially cup-shaped and are secured to a mounting member which consists of a pair of strips 52 and 52'. The inner mounting strip 52' is provided at uniform intervals with apertures 53 through which the comb-tooth-shaped ends 54 of filaments 51 are passed until the cup-shaped ends of the opposite side engage with the webs 55 which remain between the adjacent apertures 53. The cover strip 52 is then applied from the outside and both strips 52 and 52' are rigidly secured to each other. For connecting the heating element to a source of current, one outer end of strips 52, 52' carries terminal strips 52 to which the two ends of the heating conductor are connected. Heating element 50 may be secured to an apparatus or housing in the same manner as the heating elements previously described, for example, by mounting or cross strips which may be secured by bolts, rivets, welding, or the like.

The heating element according to FIGURE 5 has a series of advantages aside from those previously mentioned. It is designed so as to require a minimum of supporting elements which, in turn, permits it to be made of any suitable size and to be mounted in different positions without danger that its required solidity will be impaired. The acute angular shape of the windings which is similar to the shape of the teeth of a coarse comb produces a considerable solidity of the heating element in the longitudinal direction, whereas the solidity in the transverse direction is determined by the width of the flat bandlike conductor.

According to FIGURE 6, a pair of heating elements of the type just described are combined with each other by connecting the cover strips 52 to each other so that the filaments 51 project freely in opposite directions.

In the embodiment according to FIGURE 7, a pair of heating elements according to FIGURE 5 are combined with each other to a heating unit by having the free ends of filaments 51 pointing toward each other. The mounting strips 52, 52' then form the lateral longitudinal members of a frame which is completed by transverse strips 56 at the ends of strips 52, 52'. The space enclosed by this frame is entirely free of any obstructing supports, and the filaments within the frame do not produce any noticeable reduction in the cross-sectional area of flow of the air through the heating unit.

Figure 8:
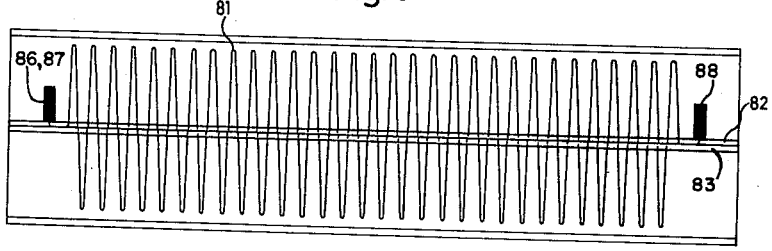
FIGURE 8 shows a side view of a further modification of the heater according to the invention.
Figure 9:
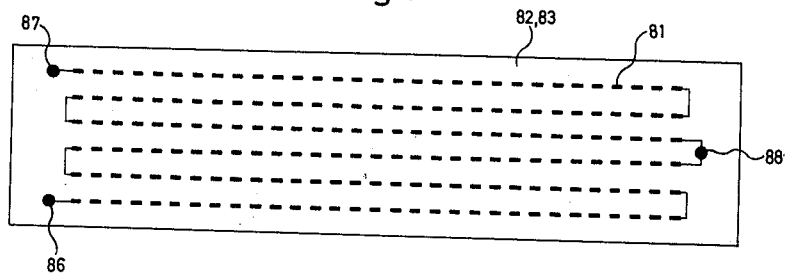
FIGURE 9 shows a plan view of a heater according to FIGURE 8.
Figure 10:
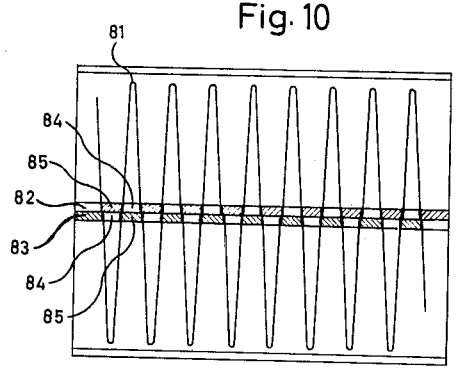
FIGURE 10 shows an enlarged section of a heater according to FIGURE 8.

In the embodiment according to FIGURES 8 to 10, the zigzag-shaped filaments 81 are mounted on a pair of superimposed mounting strips 82 and 83 which are provided with apertures 84 which are separated by webs 85. When the two strips are applied upon each other, webs 85 of one mounting strip are disposed opposite to the apertures 84 in the other strip. The acute angle, zigzag-shaped filaments 81 are inserted into the apertures 84 of mounting strips 82 and 83 so as to project equally toward the opposite sides thereof. Webs 85 of strips 82 and 83 are slightly wider in the longitudinal direction of the strips than apertures 84. When the two mounting strips 82 and 83 are clamped to each other after the filaments 81 are inserted therein, the edges of webs 85 which engage with the filaments exert a lateral pressure thereon which results in a slight deformation of the filaments at these points, whereby the filaments will be firmly clamped so as to be immovable relative to each other.

As illustrated in FIGURE 9, the filaments 81 may also be mounted on mounting strips or plates 82 and 83 in several rows. The connecting terminals 86 and 87 may be provided on one end of mounting strips 82, 83, while additional terminals, for example, the terminal 88, may be provided for switching off parts of the heating element.

Figure 11A:
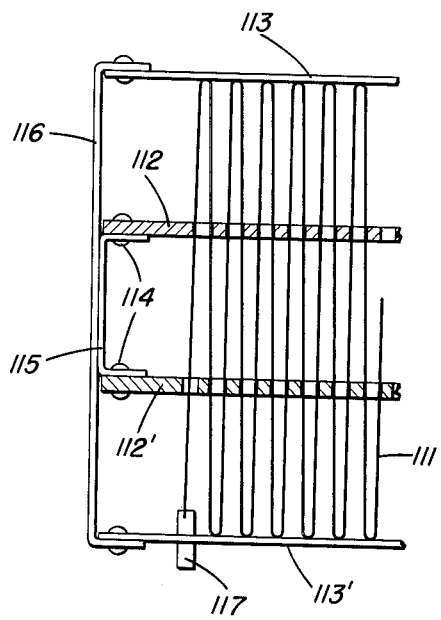
FIGURE 11a is a detail of the construction illustrated in FIGURE 11.
Figure 11:
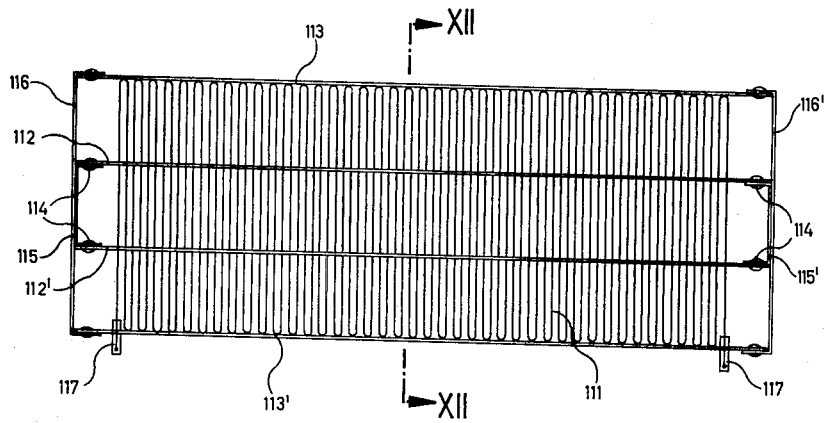
Figure 12:
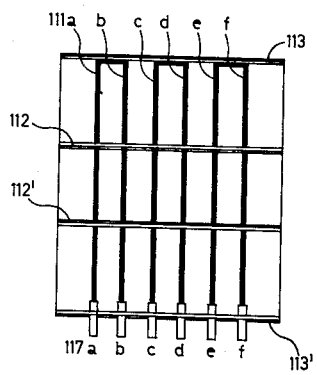
FIGURE 12 shows a cross section taken along line XII—XII of FIGURE 11.

FIGURES 11 and 12 illustrate a heating unit which is composed of six heating conductors 111 of a bandlike resistance material which are wound in a meanderlike arrangement so as to extend within parallel planes and at equal distances from each other. The windings or filaments of this heating unit are supported by a pair of equally spaced mounting strips or plates 112 and 112′, for example, of mica, and the turns of the windings engage on two additional supporting plates 113 and 113′ of insulating material. Mounting plates 112 and 112′ and supporting plates 113 and 113′ are preferably equally spaced from each other. Mounting plates 112 and 112′ are connected at both ends by suitable means, for example, bolts 114, to U-shaped cross strips 115 and 115′ to form a closed rectangular frame. Supporting plates 113 and 113′ are likewise combined with U-shaped cross strips 116 and 116′ to form a rectangular supporting frame which has the same length as the mounting frame and surrounds the latter, but has a width greater than the mounting frame. The cross strips 116 and 116′ are applied directly upon the outside of cross strips 115 and 115′, respectively, and are secured thereto.

The mounting plates 112 and 112′ are provided with six adjacent rows of apertures in accordance with the six rows of filaments, and each individual filament is passed through one of the apertures in each mounting plate. The opposite ends of filaments 111a to 111f are provided with terminal strips 117a to 117f which are passed through the lower supporting plate 113′ to the outside where they may be connected to an electric circuit either individually or, by means of contact bars, in groups. For increasing the solidity of the entire frame structure, the supporting plates 113 and 113′ may also be made of metal and be covered on the inner side with insulating material, for example, mica or the like.

An electric heating unit as illustrated in FIGURES 11, 11a and 12 thus forms a rectangular frame consisting of the supporting plates 113 and 113′ and the cross strips 116 and 116′, in which the filaments 111a to 111f, which are provided with the terminal strips 117a to 117f and are secured by the latter to the supporting plate 113′, are freely suspended in such a manner that the turns of the filaments engage upon the supporting plates 113 and 113′, while the mounting plates 112 and 112′ are held in a spaced relation to each other. A heating unit of such a construction in combination with the use of electric conductors of a bandlike resistance material which are disposed in planes coinciding with the direction of the gas or air current passing therethrough, has the great advantage that its free cross-sectional area for the flow of air therethrough differs only slightly from its total cross-sectional area and that it permits a very high heating capacity in relation to its size. It further insures a uniform temperature stability of the filaments and prevents practically all mechanical stresses.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A high capacity electric heater for heating a current of gaseous medium flowing therethrough, comprising wall means defining a channel through which said current of gaseous medium flows and at least one thin flat strip of conductive material arranged in said channel, said strip being bent in a zigzag fashion to form an undulating heating coil the plane of which extends at right angles to the flow of said gaseous medium, the plane of said strip extending essentially at right angles to said plane of the heating coil and essentially parallel to the flow of said current, said strip having a plurality of bends therein defining deflection points, said wall means including essentially flat inner and outer mounting elements for said heating coil defining in part the wall of said channel, the inner mounting element with respect to said channel having a plurality of apertures therein, said strip being supported within each aperture in said inner element with said deflection points inserted therein and being supported upon said outer element adjacent said apertures in a freely suspended manner, whereby said strip will absorb static stresses, said heating coil being supported in said channel only at said deflection points, the outer mounting element forming a cover member for said inner mounting element and being secured to said inner element in contact with portions of said strip at the said deflection points adjacent the outer side of said inner element.

2. A high capacity electric heater for heating a current of gaseous medium flowing therethrough, comprising wall means defining a channel through which said current of gaseous medium flows and at least one thin flat strip of conductive material arranged in said channel, said strip being bent in a zig-zag fashion to form an undulating heating coil comprising a plurality of filaments connected by turns in the form of loops at the ends thereof, the plane of which heating coil extends at right angles to the flow of said current of gaseous medium, the plane of said filaments extending essentially at right angles to said plane of the heating coil and essentially parallel to the flow of said current, said turns in said strip defining deflection points, said wall means including a pair of spaced parallel mounting means for said strip each defining a wall for said channel, each of said mounting means including two essentially flat mounting elements, the inner mounting element of each said mounting means with respect to said channel of each said mounting means having a plurality of apertures therein and defining a securing member for said strip, said strip being supported between oppositely disposed mounting elements with each aperture in each said inner element receiving a respective loop of said undulating heating coil, the turns formed at the opposite ends of said filaments being adjacent the outer side of respective inner elements, said strip being freely suspended at said deflection points whereby said plurality of filaments are self-supported between said mounting means, the outer mounting element for each mounting means with respect to said channel defining a covering member for the respective inner element thereof and being secured to said respective inner element, crossbars connecting the ends of said mounting elements to each other so as to form a closed frame, means for securing said frame in a fixed position, and electric connecting means for said strip mounted on said frame, said mounting elements being of considerable length, and additional means for connecting said frame members to each other and for tightening the same against said filaments.

3. A high capacity electric heater for heating a current of gaseous medium flowing therethrough, comprising wall means defining a channel through which said current of gaseous medium flows and at least one thin flat strip of conductive material arranged in said channel, said strip being bent in a zig-zag fashion to form an undulating heating coil comprising a plurality of filaments connected by turns in the form of loops at the ends thereof, the plane of which heating coil extends at right angles to the flow of said current of gaseous medium, the plane of said filaments extending essentially at right angles to said plane of the heating coil and essentially parallel to the flow of said current, said turns in said strip defining deflection points, said wall means including a pair of spaced parallel mounting means for said strip each defining a wall for said channel, each of said mounting means including two essentially flat mounting elements, the inner mounting element of each said mounting means with respect to said channel of each said mounting means having a plurality of apertures therein and defining a securing member for said strip, said strip being supported by said mounting elements with each aperture in each said inner element receiving a respective loop of said undulating heating coil, the turns formed at the opposite ends of said filaments being adjacent the outer side of respective inner elements, said strip being freely suspended at said deflection points whereby said plurality of filaments are self-supported between said mounting means, the outer mounting element for each mounting means with respect to said channel defining a covering member for the respective inner element thereof and being secured to said respective inner element, each of said inner mounting elements having several parallel rows of said apertures therein for receiving the filaments of a plurality of heating conductor strips.

4. A high capacity electric heater for heating a current of gaseous medium flowing therethrough, comprising wall means defining a channel through which said current of gaseous medium flows and at least one thin flat strip of conductive material arranged in said channel, said strip being bent in a zig-zag fashion to form an undulating heating coil comprising a plurality of straight parallel portions and a plurality of sharp turns at the ends thereof, the plane of which heating coil extends at right angles to the flow of said current of gaseous medium with the plane of said straight portions of said strip extending essentially at right angles to said plane of the heating coil and essentially parallel to the flow of said gaseous medium, said wall means including a pair of spaced parallel mounting means for said strip, each said mounting means defining a wall for said channel and including essentially flat inner and outer mounting elements, said inner mounting element of each mounting means having a plurality of apertures therein, said strip being supported with a sharp turn of said coil positioned within each aperture in each said inner element supporting said undulating heating coil, said sharp turns formed in said strip being adjacent the outer side of respective inner mounting elements, said strip being freely suspended whereby said plurality of filaments are self supported between said mounting means, the outer mounting element for each mounting means defining a covering member for the respective inner element thereof and being secured to said respective inner element in contact with the sharp turns formed in said strip.

5. An electric heater as defined in claim 4, wherein the mounting elements of each said mounting means are annular members and said mounting means are coaxially arranged.

References Cited by the Examiner

UNITED STATES PATENTS

| | | | |
|---|---|---|---|
| 1,065,015 | 6/1913 | Youmans | 338—290 |
| 1,396,813 | 11/1921 | Colby | 338—295 X |
| 1,413,001 | 4/1922 | Brooks | 338—280 |
| 1,417,073 | 5/1922 | Kruesheld | 338—290 X |
| 1,456,107 | 5/1923 | Ipsen. | |
| 1,630,368 | 5/1927 | Woodson | 13—25 |
| 2,537,796 | 1/1951 | Sieklucki et al. | 174—138 |
| 2,858,402 | 10/1958 | Griffes et al. | 338—58 |
| 2,870,308 | 1/1959 | Satchwell | 338—295 X |
| 2,912,661 | 11/1959 | Balestrini | 338—58 |

ANTHONY BARTIS, *Primary Examiner.*

RICHARD M. WOOD, ROBERT K. WINDHAM,
                                            *Examiners.*

W. D. BROOKS, H. T. POWELL, *Assistant Examiners.*